(12) United States Patent
Ueda (10) Patent No.: US 10,845,813 B2
(45) Date of Patent: Nov. 24, 2020

(54) ROUTE SETTING METHOD AND ROUTE SETTING DEVICE

(71) Applicant: Nissan Motor Co., Ltd., Yokohama (JP)

(72) Inventor: Hirotoshi Ueda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/336,289

(22) PCT Filed: Sep. 26, 2016

(86) PCT No.: PCT/JP2016/078297
§ 371 (c)(1),
(2) Date: Mar. 25, 2019

(87) PCT Pub. No.: WO2018/055773
PCT Pub. Date: Mar. 29, 2018

(65) Prior Publication Data
US 2019/0227560 A1    Jul. 25, 2019

(51) Int. Cl.
*G05D 1/02*    (2020.01)
*G05D 1/00*    (2006.01)
(Continued)

(52) U.S. Cl.
CPC ......... *G05D 1/0212* (2013.01); *B60W 30/165* (2013.01); *B60W 40/04* (2013.01);
(Continued)

(58) Field of Classification Search
CPC . G05D 1/0212; G05D 1/0287; B60W 30/165; B60W 40/04; B62D 15/025; G08G 1/20; G01C 21/34
See application file for complete search history.

(56) References Cited

U.S. PATENT DOCUMENTS 10,384,681 B2    8/2019  Masui et al.
2009/0216405 A1*  8/2009  Kudo ................... B62D 15/025
                                                 701/41

(Continued)

FOREIGN PATENT DOCUMENTS

JP    H02291100 A    11/1990
JP    2004220348 A    8/2004
(Continued)

*Primary Examiner* — Thomas G Black
*Assistant Examiner* — Sara J Lewandroski
(74) *Attorney, Agent, or Firm* — Young Basile Hanlon & MacFarlane, P.C.

(57) ABSTRACT

A route setting method capable of causing a host vehicle to continuously follow traveling tracks of other vehicles including a preceding vehicle so as to travel stably uses a peripheral vehicle sensor installed in the host vehicle to detect positions of other vehicles traveling around the host vehicle, and a controller for setting a route of the host vehicle according to traveling tracks of the other vehicles based on histories of positions of the other vehicles, the method including calculating a displaced amount of traveling tracks of the preceding vehicle specified from the other vehicles, and setting the route of the host vehicle according to traveling tracks of another vehicle different from the preceding vehicle when the displaced amount of the traveling tracks of the preceding vehicle is a threshold or greater.

8 Claims, 10 Drawing Sheets

(51) Int. Cl.
  *G08G 1/16* (2006.01)
  *G01C 21/34* (2006.01)
  *B60W 40/04* (2006.01)
  *B62D 15/02* (2006.01)
  *B60W 30/165* (2020.01)

(52) U.S. Cl.
  CPC ....... *B62D 15/025* (2013.01); *G01C 21/3407* (2013.01); *G05D 1/0088* (2013.01); *G08G 1/163* (2013.01); *G08G 1/166* (2013.01)

(56) References Cited

U.S. PATENT DOCUMENTS

| | | |
|---|---|---|
| 2011/0285574 A1 | 11/2011 | Tsunekawa |
| 2014/0019031 A1* | 1/2014 | Solyom ................ G05D 1/0293 701/117 |
| 2015/0088382 A1* | 3/2015 | Obuchi ................ B60W 30/14 701/41 |
| 2015/0307095 A1* | 10/2015 | Aso ...................... B60W 30/12 701/1 |
| 2016/0200321 A1* | 7/2016 | Yamada ................ G05D 1/021 701/96 |
| 2016/0297436 A1* | 10/2016 | Shin ...................... G08G 1/163 |
| 2017/0158238 A1* | 6/2017 | Takaso ................ G05D 1/0246 |
| 2017/0197620 A1* | 7/2017 | Igarashi ............... B60W 30/165 |
| 2017/0267237 A1* | 9/2017 | Oyama ................ B60W 10/18 |
| 2017/0327118 A1 | 11/2017 | Masui et al. |
| 2018/0022351 A1 | 1/2018 | Habu et al. |
| 2018/0170241 A1* | 6/2018 | Mizuno ................ B60Q 1/085 |
| 2019/0168758 A1* | 6/2019 | Matsumoto .......... G01S 13/867 |

FOREIGN PATENT DOCUMENTS

| | | |
|---|---|---|
| JP | 2004322916 A | 11/2004 |
| JP | 2010070061 A | 4/2010 |
| JP | 2011-98586 A | 5/2011 |
| JP | 2015058920 A | 3/2015 |
| JP | 2016101889 A | 6/2016 |
| JP | 2016-134093 A | 7/2016 |
| WO | 2010070708 A1 | 6/2010 |
| WO | 2016129646 A1 | 8/2016 |

* cited by examiner

ROUTE SETTING METHOD AND ROUTE SETTING DEVICE

TECHNICAL FIELD

The present invention relates to a route setting method and a route setting device.

BACKGROUND

To reduce a driver's load during autonomous driving when a host vehicle is following a preceding vehicle, a technology is provided to calculate traveling tracks of the preceding vehicle traveling on the same lane as the host vehicle and traveling tracks of another vehicle traveling alongside on another lane, so as to determine whether the traveling tracks of the preceding vehicle are parallel to the traveling tracks of the other vehicle traveling alongside. The technology controls the host vehicle to follow the traveling tracks of the preceding vehicle when the respective traveling tracks of the preceding vehicle and the other vehicle are determined to be parallel to each other (refer to Japanese Patent Unexamined Publication No. 2004-322916).

However, the technology disclosed in Japanese Patent Unexamined Publication No. 2004-322916 cannot keep a constant follow-up control when the preceding vehicle such as a two-wheeled vehicle is weaving right and left, for example, since the weaving vehicle is determined not to be parallel to the other vehicle traveling alongside. While relaxation of the conditions for determining parallel traveling may allow the follow-up control when the preceding vehicle is weaving, the host vehicle could also weave and travel unstably.

In response to the above issue, it is an object of the present invention to provide a route setting method and a route setting device capable of causing a host vehicle to continuously follow traveling tracks of other vehicles including a preceding vehicle so as to travel stably.

SUMMARY

An aspect of the present invention provides a route setting method and a route setting device configured to detect positions of other vehicles traveling around a host vehicle and set a route of the host vehicle according to traveling tracks of the other vehicles based on histories of positions of the other vehicles. The method and device are further configured to calculate a displaced amount of traveling tracks of a preceding vehicle specified from the other vehicles, and set the route of the host vehicle according to traveling tracks of another vehicle different from the preceding vehicle when the displaced amount of the traveling tracks of the preceding vehicle is a predetermined threshold or greater.

DETAILED DESCRIPTION

Hereinafter, an embodiment according to the present invention will be described with reference to the Drawings. In the descriptions of the Drawings below, the same or similar elements are indicated by the same or similar reference numerals. It should be understood that the Drawings are illustrated schematically, and relationships of thicknesses and planar dimensions, and proportions of the respective thicknesses are not drawn to scale. It also should be understood that the relationships or proportions of the dimensions between the respective Drawings may differ from each other. The embodiment described below illustrates a device and a method for embodying the technical ideas of the present invention, and the technical ideas of the present invention are not intended to be limited to the materials, shapes, structures, or arrangements of the elements as described herein. The technical ideas of the present invention are to cover various modifications falling within the scope of the invention as defined by the appended claims.

Figure 1:
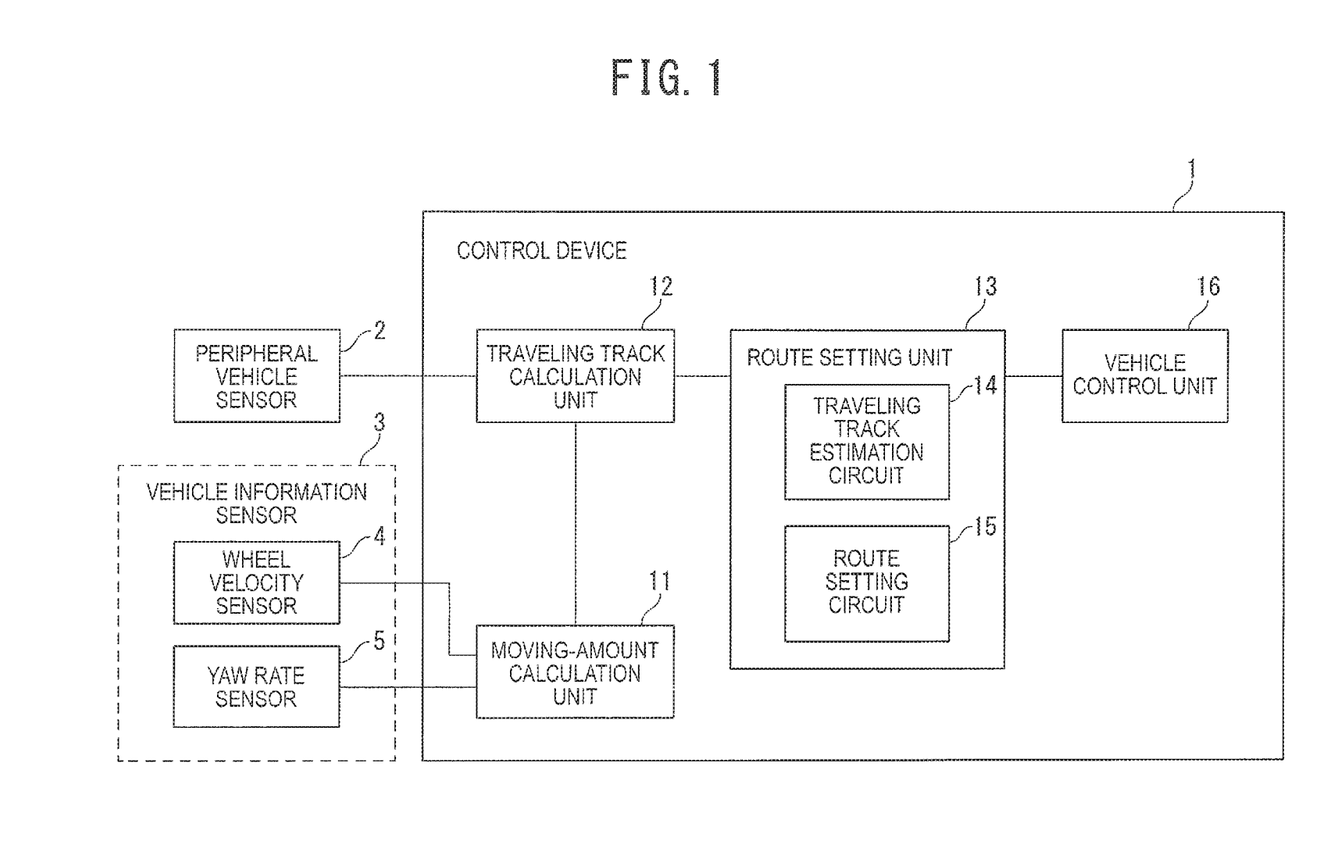
FIG. 1 is a block diagram illustrating a route setting device according to an embodiment of the present invention.

A route setting device according to the embodiment can be installed in a vehicle (hereinafter, a vehicle equipped with the route setting device according to the embodiment of the present invention is referred to as a "host vehicle"). As illustrated in FIG. 1, the route setting device according to the embodiment includes a control device 1, a peripheral vehicle sensor 2, and a vehicle information sensor 3.

The peripheral vehicle sensor 2 detects positions including distances and directions of other vehicles, such as a preceding vehicle, traveling around the host vehicle, and outputs the information on the positions of the detected other vehicles to the control device 1. The peripheral vehicle sensor 2 may be a millimeter-wave radar, a laser radar, a laser rangefinder (LRF), or a camera. The type, number, and installation position of the peripheral vehicle sensor 2 may vary as appropriate.

The vehicle information sensor 3 detects vehicle information (odometry information) including traveling conditions of the host vehicle. The vehicle information sensor 3 includes a wheel velocity sensor 4 and a yaw rate sensor 5. The wheel velocity sensor 4 detects a velocity of the wheels of the host vehicle, and outputs the information on the detected wheel velocity to the control device 1. The yaw rate sensor 5 detects a rate of change of a yaw angle (a yaw rate)

of the host vehicle, and outputs the information on the detected yaw rate to the control device 1.

The control device 1 is a controller such as an electronic control unit (ECU), and includes a processor and a storage device. The processor may be a computer including a central processing unit (CPU), a main storage device, an input/output device, an input/output interface, and a data bus, or a semiconductor integrated circuit equivalent to the computer. When the processor is a semiconductor integrated circuit, the semiconductor integrated circuit may include a programmable logic device (PLD) such as a field-programmable gate array (FPGA). Alternatively, the processor may include a functional logic circuit or a logic block arranged in a general-purpose semiconductor integrated circuit. The storage device may be any of a semiconductor storage device, a magnetic storage device, and an optical storage device, and may include a register and a cache memory.

The control device 1 includes a moving-amount calculation unit 11, a traveling track calculation unit 12, and a route setting unit 13 as logical hardware sources. The moving-amount calculation unit 11 calculates the moving amount ($\Delta X$, $\Delta Y$, $\Delta \phi$) of the host vehicle in accordance with the wheel velocity detected by the wheel velocity sensor 4 and the vehicle information (odometry information) such as the yaw rate detected by the yaw rate sensor 5. As used herein, the symbol $\Delta X$ represents a translation amount in a vehicle width direction of the host vehicle, the symbol $\Delta Y$ represents a translation amount in a front-rear direction perpendicular to the vehicle width direction of the host vehicle, and the symbol $\Delta \phi$ represents a rotation amount.

The traveling track calculation unit 12 calculates traveling tracks of another vehicle based on a history of positions of the other vehicle (in a time series) in accordance with the moving amount ($\Delta X$, $\Delta Y$, $\Delta \phi$) of the host vehicle calculated by the moving-amount calculation unit 11 and the information on the positions of the other vehicle detected by the peripheral vehicle sensor 2. For example, the traveling track calculation unit 12 extracts another vehicle present within a predetermined distance to the host vehicle in the front direction, the front right direction, and the front left direction of the host vehicle, and calculates the traveling tracks of the extracted other vehicle. The predetermined distance may be determined as appropriate within a range in which the host vehicle can follow the other vehicle. When the peripheral vehicle sensor 2 detects a plurality of other vehicles, the traveling track calculation unit 12 calculates the traveling tracks of each vehicle respectively.

For example, the traveling track calculation unit 12 successively stores, in the storage device of the control device 1, a central position at a rear portion of the other vehicle as a position (a reference point) of the other vehicle based on the detection result of the peripheral vehicle sensor 2. The traveling track calculation unit 12 reads out, from the storage device of the control device 1, a history of the positions (the reference points) of the other vehicle stored by the previous processing period and reversely moves the positions by the moving amount ($\Delta X$, $\Delta Y$, $\Delta \phi$) of the host vehicle, so as to update the history of the positions of the other vehicle stored by the previous processing period. The traveling track calculation unit 12 adds the position of the other vehicle detected in the current processing period to the updated history of the positions of the other vehicle stored by the previous processing period, so as to obtain the history of the positions of the other vehicle stored by the current processing period as traveling tracks of the other vehicle. An approximate curve may be calculated as traveling tracks of the other vehicle such that the history of the positions of the other vehicle is caused to approximate to a curve, for example.

Figure 2:
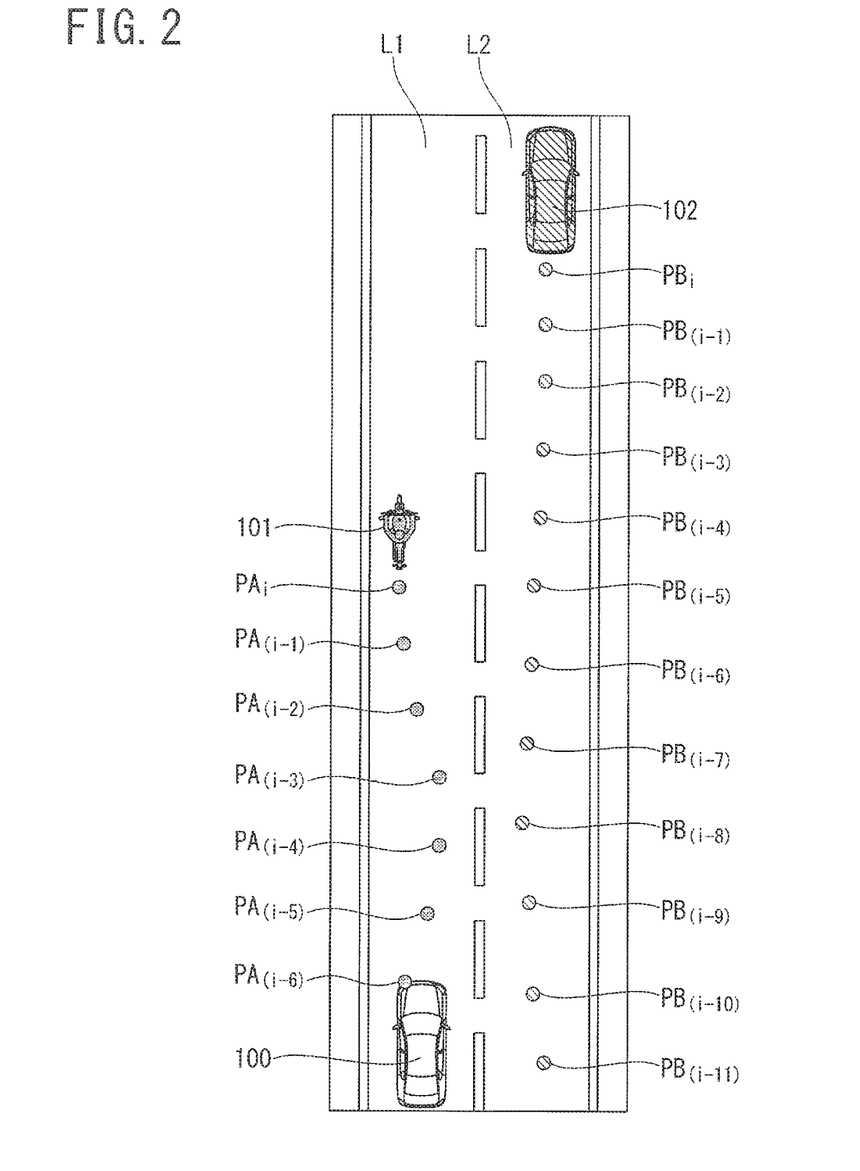
FIG. 2 is a schematic diagram illustrating a traveling situation according to the embodiment of the present invention.

The processing of calculating traveling tracks of other vehicles by the traveling track calculation unit 12 is illustrated with reference to FIG. 2. The host vehicle 100 is traveling on the left lane L1 of a road with two lanes L1 and L2 in one direction. Another vehicle (a preceding vehicle) 101 is traveling forward of the host vehicle 100 on the same lane L1 as the host vehicle 100. Still another vehicle 102 is traveling on the front right side of the host vehicle 100 on the right lane L2.

The traveling track calculation unit 12 reads out, from the storage device of the control device 1, the positions $PA_{(i-1)}$, $PA_{(i-2)}$, $PA_{(i-3)}$, $PA_{(i-4)}$, $PA_{(i-5)}$ and $PA_{(i-6)}$ of the preceding vehicle 101 stored by the previous processing period and reversely moves the positions by the moving amount ($\Delta X$, $\Delta Y$, $\Delta \phi$) of the host vehicle 100, so as to update the positions $PA_{(i-1)}$ to $PA_{(i-6)}$ of the preceding vehicle 101. The traveling track calculation unit 12 adds the position $PA_i$ of the preceding vehicle 101 detected by the peripheral vehicle sensor 2 in the current processing period to the updated positions $PA_{(i-1)}$ to $PA_{(i-6)}$ of the preceding vehicle 101 so as to obtain the traveling tracks $PA_i$ to $PA_{(i-6)}$ of the preceding vehicle 101.

The traveling track calculation unit 12 also reads out, from the storage device of the control device 1, the positions $PB_{(i-1)}$, $PB_{(i-2)}$, $PB_{(i-3)}$, $PB_{(i-4)}$, $PB_{(i-5)}$, $PB_{(i-6)}$, $PB_{(i-7)}$, $PB_{(i-8)}$, $PB_{(i-9)}$, $PB_{(i-10)}$, and $PB_{(i-11)}$ of the other vehicle 102 stored by the previous processing period and reversely update the positions $PB_{(i-1)}$ to $PB_{(i-11)}$ of the other vehicle 102 by the moving amount ($\Delta X$, $\Delta Y$, $\Delta \phi$) of the host vehicle 100. The traveling track calculation unit 12 adds the position $PB_i$ of the other vehicle 102 detected by the peripheral vehicle sensor 2 in the current processing period to the updated positions $PB_{(i-1)}$ to $PB_{(i-11)}$ of the other vehicle 102 so as to obtain the traveling tracks $PB_i$ to $PB_{(i-11)}$ of the other vehicle 102.

The route setting unit 13 illustrated in FIG. 1 sets a route of the host vehicle according to traveling tracks of other vehicles calculated by the traveling track calculation unit 12. The route setting unit 13 includes a traveling track estimation circuit 14 and a route setting circuit 15 as logical hardware sources. The traveling track estimation circuit 14 specifies other vehicles traveling on the same lane as the host vehicle (determines whether the other vehicles are traveling on the same lane as the host vehicle) in accordance with the traveling tracks of the other vehicles calculated by the traveling track calculation unit 12.

For example, the traveling track estimation circuit 14 calculates a distance between the host vehicle and traveling tracks of another vehicle calculated by the traveling track calculation unit 12, and determines that the other vehicle is traveling on the same lane as the host vehicle when the calculated distance is less than a predetermined threshold (for example, 2.0 meters). The traveling track estimation circuit 14 determines that the other vehicle is not traveling on the same lane as the host vehicle (determines that the other vehicle is traveling on the different lane from the host vehicle) when the calculated distance is the predetermined threshold (for example, 2.0 meters) or greater. The predetermined threshold may be set as appropriate depending on the width of the traveling lane, for example.

Figure 3:
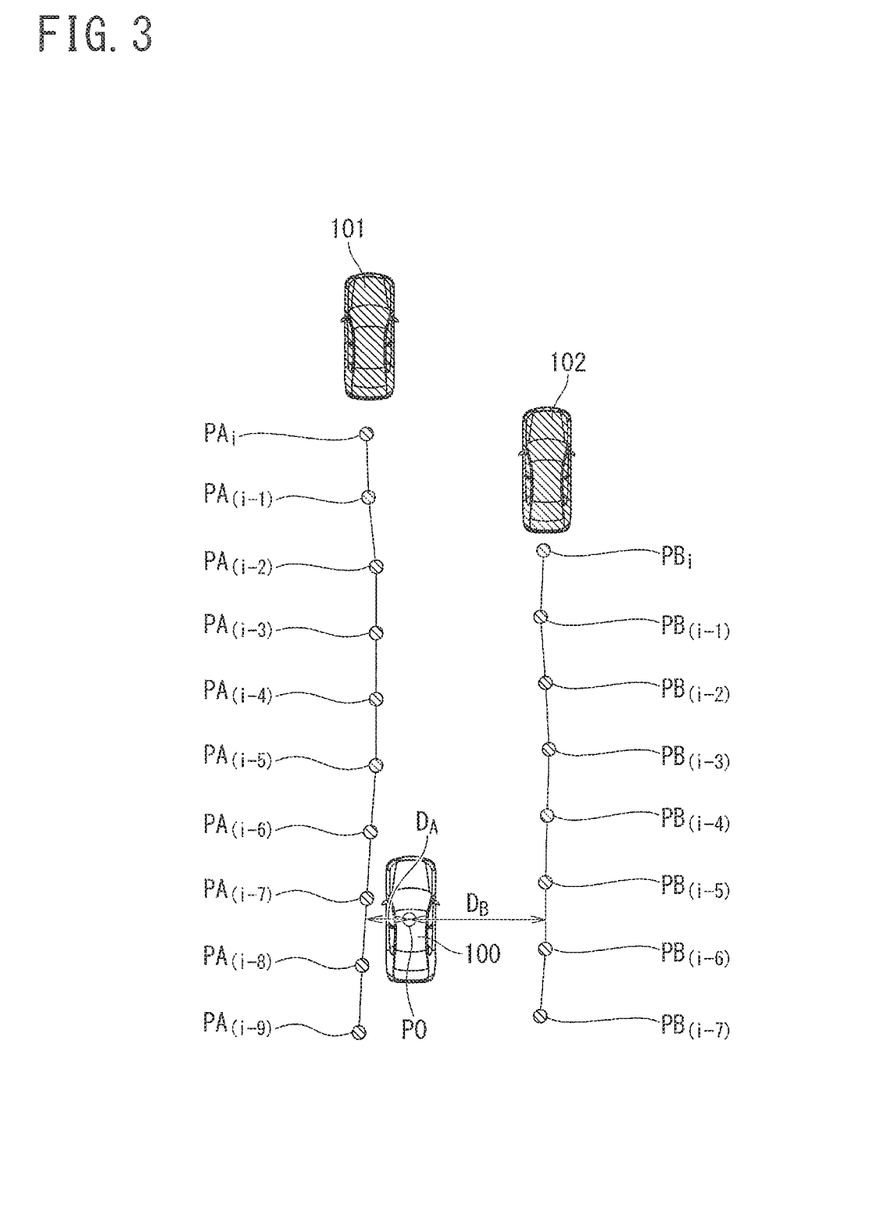
FIG. 3 is a schematic diagram illustrating a process of determining travel lanes of other vehicles according to the embodiment of the present invention.

As a particular example, FIG. 3 illustrates a case in which traveling tracks $PA_i$ to $PA_{(i-9)}$ of a vehicle 101 and traveling tracks $PB_i$ to $PB_{(i-7)}$ of another vehicle 102 are calculated by the traveling track calculation unit 12. The traveling track estimation circuit 14 calculates a distance DA in the vehicle width direction of the host vehicle 100 between the center of gravity P0 of the host vehicle 100 and, for example, an approximate curve of the traveling tracks $PA_i$ to $PA_{(i-9)}$ of the vehicle 101. In this example, the distance DA is less than the predetermined threshold (for example, 2.0 meters), and the vehicle 101 is thus determined to be traveling on the same lane L1. The traveling track estimation circuit 14 also calculates a distance DB in the vehicle width direction of the host vehicle 100 between the center of gravity P0 of the host vehicle 100 and, for example, an approximate curve of the traveling tracks $PB_i$ to $PB_{(i-7)}$ of the other vehicle 102. In this example, the distance DB is the predetermined threshold (for example, 2.0 meters) or greater, and the other vehicle 102 is thus determined not to be traveling on the same lane L1 (determined to be traveling on the different lane L2).

The traveling track estimation circuit 14 further specifies a vehicle, as a preceding vehicle, traveling forward of the host vehicle and closest to the host vehicle among the other vehicles determined to be traveling on the same lane. When the peripheral vehicle sensor 2 can detect the next preceding vehicle traveling forward of the preceding vehicle, the traveling track estimation circuit 14 specifies the vehicle traveling forward of the host vehicle and second closest to the host vehicle as the next preceding vehicle among the other vehicles determined to be traveling on the same lane.

Figure 4:
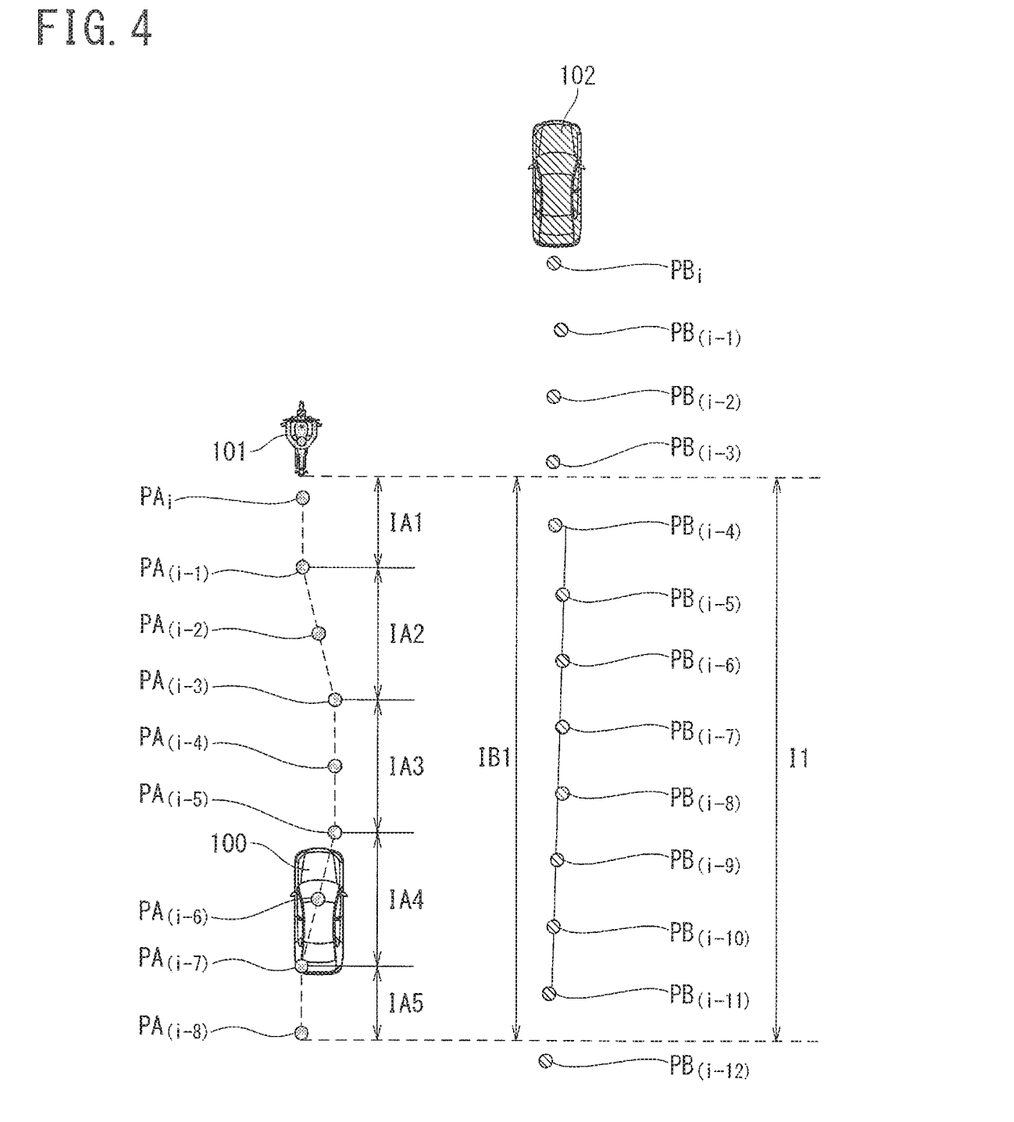
FIG. 4 is a schematic diagram illustrating a process of estimating traveling tracks of a preceding vehicle according to the embodiment of the present invention.

The traveling track estimation circuit 14 estimates the traveling tracks of the other vehicles calculated by the traveling track calculation unit 12. For example, the traveling track estimation circuit 14 calculates the displaced amounts of the traveling tracks of the other vehicles obtained by the traveling track calculation unit 12 in the right and left direction (in the vehicle width direction or the direction perpendicular to the lane) within a predetermined estimation interval, and outputs the calculated displaced amounts as estimation results. For example, as illustrated in FIG. 4, the preceding vehicle (the two-wheeled vehicle) 101 and the other vehicle 102 are presumed to be present. The traveling track estimation circuit 14 sets the estimation interval I1 from the position of the preceding vehicle 101 to a position distant rearward by a predetermined distance (for example, 100 meters). The estimation interval I1 may be set as appropriate depending on the position and relative velocity of the preceding vehicle 101 and the velocity of the host vehicle 100, for example.

The traveling track estimation circuit 14 causes the traveling tracks $PA_i$ to $PA_{(i-8)}$ of the preceding vehicle 101 within the estimation interval I1 to approximate to a straight line, and divides the approximate interval into sections when a distance between the approximate straight line and the respective traveling tracks $PA_i$ to $PA_{(i-8)}$ is a predetermined threshold (for example, 0.2 meters) or greater so that the distance between the approximate straight line and the respective traveling tracks $PA_i$ to $PA_{(i-8)}$ results in less than the predetermined threshold (for example, 0.2 meters). FIG. 4 illustrates the case in which the traveling tracks $PA_i$ to $PA_{(i-8)}$ of the preceding vehicle 101 are divided into five approximate intervals IA1 to IA5 corresponding to five approximate straight lines indicated by the broken lines, so that the divided number which is five is calculated as the displaced amount (the estimation result) of the traveling tracks $PA_i$ to $PA_{(i-8)}$ of the preceding vehicle 101.

When the other vehicle 102 is located forward of the preceding vehicle 101, as illustrated in FIG. 4, the estimation interval I1 of the preceding vehicle 101 is also used for estimating the traveling tracks $PB_i$ to $PB_{(i-12)}$ of the other vehicle 102. The traveling track estimation circuit 14 causes the traveling tracks $PB_{(i-4)}$ to $PB_{(i-11)}$ of the other vehicle 102 within the estimation interval I1 to approximate to a straight line, and divides the approximate interval into sections when a distance between the approximate straight line and the respective traveling tracks $PB_{(i-4)}$ to $PB_{(i-11)}$ is the predetermined threshold (for example, 0.2 meters) or greater so that the distance between the approximate straight line and the respective traveling tracks $PB_{(i-4)}$ to $PB_{(i-11)}$ results in less than the predetermined threshold (for example, 0.2 meters). FIG. 4 illustrates the case in which the traveling tracks $PB_{(i-4)}$ to $PB_{(i-11)}$ of the other vehicle 102 are not divided to obtain a single approximate interval IB1 corresponding to a single approximate curve indicated by the solid line, so that the divided number which is one is calculated as the displaced amount (the estimation result) of the traveling tracks $PB_{(i-4)}$ to $PB_{(i-11)}$ of the other vehicle 102.

Figure 5:
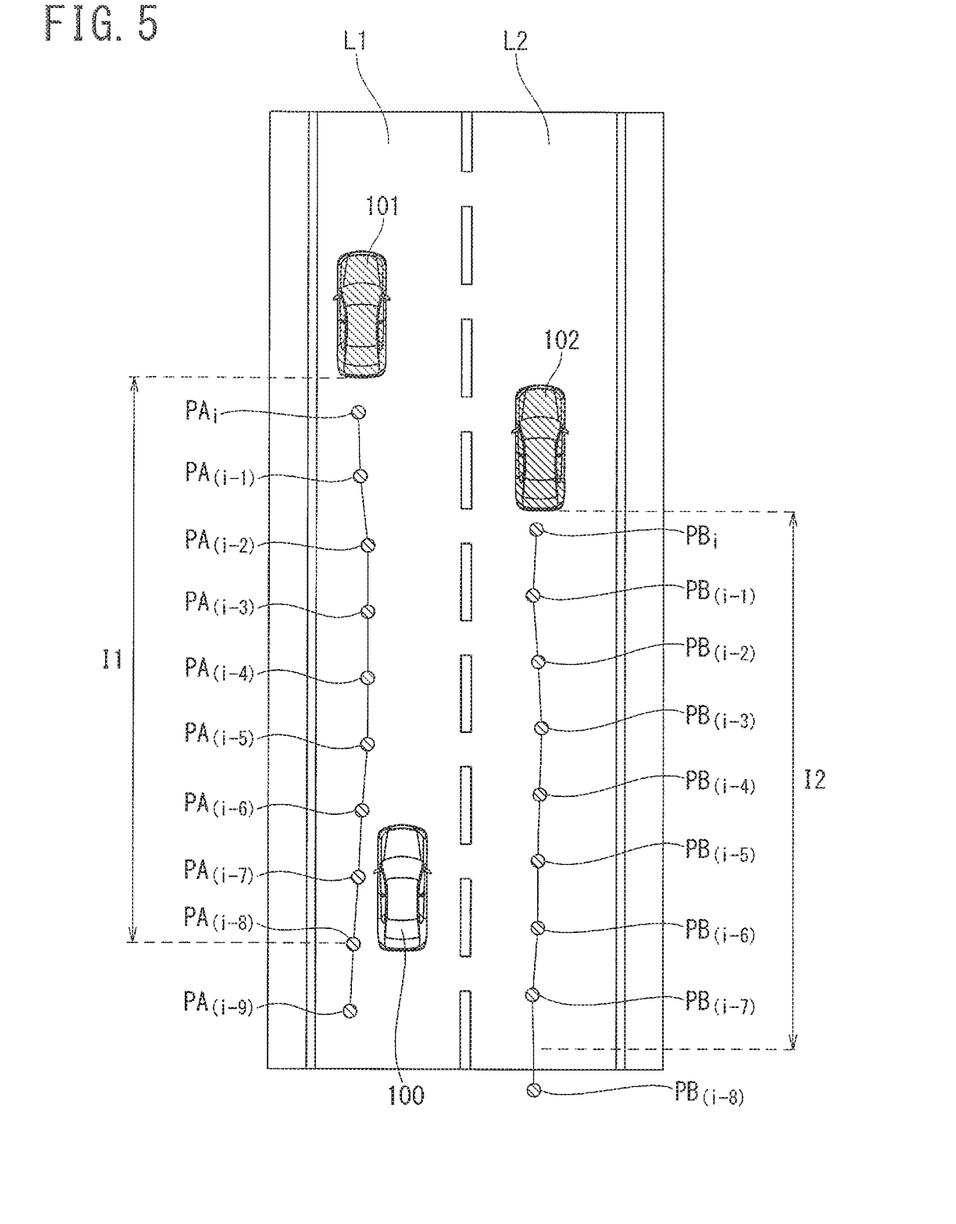
FIG. 5 is a schematic diagram illustrating a process of setting an estimation interval according to the embodiment of the present invention.

When the other vehicle 102 is located rearward of the preceding vehicle 101, as illustrated in FIG. 5, the traveling track estimation circuit 14 sets an estimation interval I2 from the position of the other vehicle 102 to a position distant rearward by a predetermined distance (for example, 100 meters), independently of the estimation interval I1 for the preceding vehicle 101. The traveling track estimation circuit 14 then estimates the traveling tracks $PB_i$ to $PB_{(i-7)}$ of the other vehicle 102 within the estimation interval I2.

The route setting circuit 15 sets a route of the host vehicle according to the estimation results of the traveling tracks of the other vehicles estimated by the traveling track estimation circuit 14. For example, the route setting circuit 15 determines whether the displaced amount of the traveling tracks of each vehicle calculated by the traveling track estimation circuit 14 is a predetermined threshold or greater. For example, as illustrated in FIG. 4, when the divided number is five obtained as the displaced amount of the traveling tracks $PA_i$ to $PA_{(i-8)}$ of the preceding vehicle 101, and the predetermined threshold set for the divided number is three, the displaced amount of the traveling tracks $PA_i$ to $PA_{(i-8)}$ of the preceding vehicle 101 is determined to be the predetermined threshold or greater. When the divided number is one obtained as the displaced amount of the traveling tracks $PB_{(i-4)}$ to $PB_{(i-11)}$ of the other vehicle 102, and the predetermined threshold set for the divided number is three, the displaced amount of the traveling tracks $PB_{(i-4)}$ to $PB_{(i-11)}$ of the other vehicle 102 is determined to be less than the predetermined threshold. The predetermined threshold may be set as appropriate depending on the estimation method by the traveling track estimation circuit 14, for example.

When the displaced amount of the traveling tracks of the preceding vehicle is less than the predetermined threshold, the traveling tracks of the preceding vehicle are presumed to be stable without weaving right and left and thus appropriate as a target to follow for the host vehicle. The route setting circuit 15 thus chooses the traveling tracks of the preceding vehicle as a target to follow for the host vehicle (as a basis for route setting of the host vehicle). When the displaced amount of the traveling tracks of the preceding vehicle is the predetermined threshold or greater, the traveling tracks of the preceding vehicle are presumed to be unstable due to right and left weaving and thus inappropriate as a target to follow for the host vehicle. The route setting circuit 15 then excludes the traveling tracks of the preceding vehicle from a target to follow for the host vehicle, and further searches for traveling tracks of another vehicle other than the preceding vehicle as a target to follow.

When the displaced amount of the traveling tracks of the preceding vehicle traveling on the same lane as the host vehicle is the predetermined threshold or greater, the route setting circuit 15 searches for traveling tracks of another vehicle other than the preceding vehicle as a target to follow for the host vehicle (as a basis for route setting of the host vehicle), and preferentially chooses traveling tracks of another vehicle, such as the next preceding vehicle, traveling on the same lane as the host vehicle instead of the preceding vehicle. When the displaced amount of the traveling tracks of the other vehicle traveling on the same lane results in the predetermined threshold or greater after the choice, the route setting circuit 15 again searches for traveling tracks of still another vehicle not chosen yet as a target to follow for the host vehicle.

Figure 6:
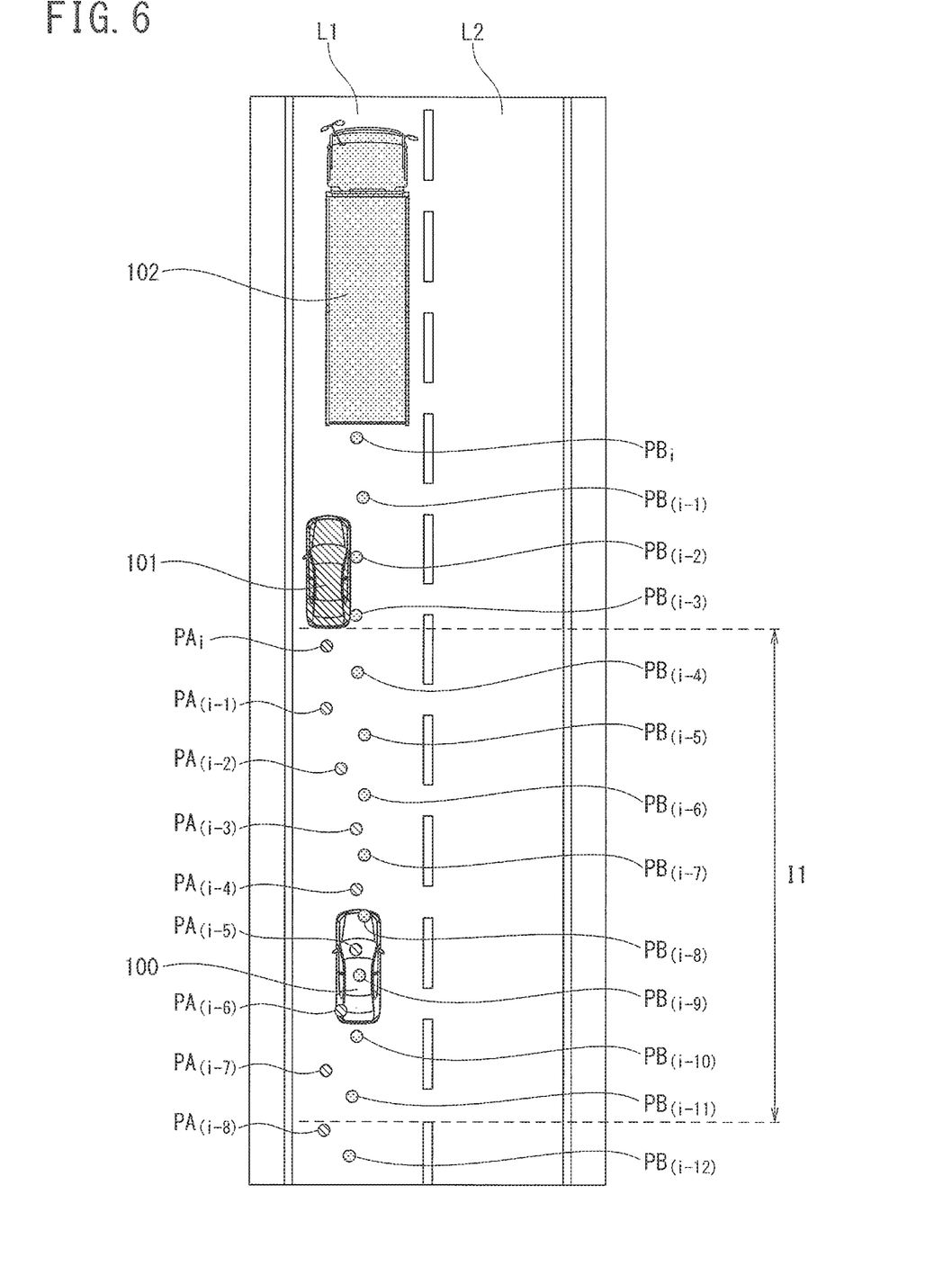
FIG. 6 is a schematic diagram illustrating a process of setting a route of the host vehicle according to the embodiment of the present invention.

For example, as illustrated in FIG. 6, when the next preceding vehicle 102 is a large-sized vehicle, the peripheral vehicle sensor 2 can detect both of the preceding vehicle 101 and the next preceding vehicle 102 in most cases. The peripheral vehicle sensor 2 may also detect the next preceding vehicle 102 when the preceding vehicle 101 is a two-wheeled vehicle. When still another vehicle forward of the next preceding vehicle 102 can be detected, for example, when the preceding vehicle 101 and the next preceding vehicle 102 are both two-wheeled vehicles, the other vehicle may be set as a target to follow for the host vehicle. When there are traveling tracks of several vehicles traveling on the same lane that the host vehicle can follow other than the preceding vehicle, a vehicle closer to the host vehicle such as the next preceding vehicle may be chosen first.

When the displaced amount of the traveling tracks of the other vehicle such as the preceding vehicle or the next preceding vehicle traveling on the same lane as the host vehicle is the predetermined threshold or greater, the route setting circuit 15 searches for traveling tracks of another vehicle traveling on the different lane from the host vehicle as a target to follow. When the displaced amount of the traveling tracks of the other vehicle traveling on the different lane is less than the predetermined threshold, the route setting circuit 15 chooses the traveling tracks of the other vehicle traveling on the different lane as a target to follow. When there are traveling tracks of several vehicles traveling on the different lane that the host vehicle can follow, a vehicle relatively close to the host vehicle may be chosen first.

The route setting circuit 15 sets a route of the host vehicle according to the traveling tracks of the other vehicle chosen as a target to follow. For example, as illustrated in FIG. 6, when the traveling tracks $PA_i$ to $PA_{(i-8)}$ of the preceding vehicle 101 or the traveling tracks $PB_i$ to $PB_{(i-12)}$ of the next preceding vehicle 102 traveling on the same lane L1 as the host vehicle 100 are chosen as a target to follow, the route setting circuit 15 sets the traveling tracks $PA_i$ to $PA_{(i-8)}$ of the preceding vehicle 101 or the traveling tracks $PB_i$ to $PB_{(i-12)}$ of the next preceding vehicle 102 directly as a route of the host vehicle 100. Alternatively, offset traveling tracks may be determined as a route of the host vehicle 100 obtained such that the traveling tracks $PA_i$ to $PA_{(i-8)}$ of the preceding vehicle 101 or the traveling tracks $PB_i$ to $PB_{(i-12)}$ of the next preceding vehicle 102 are offset toward the host vehicle 100 by a distance between the preceding vehicle 101 or the next preceding vehicle 102 and the host vehicle 100 in the vehicle width direction previously calculated during the lane determination processing for the preceding vehicle 101 or the next preceding vehicle 102.

Figure 7:
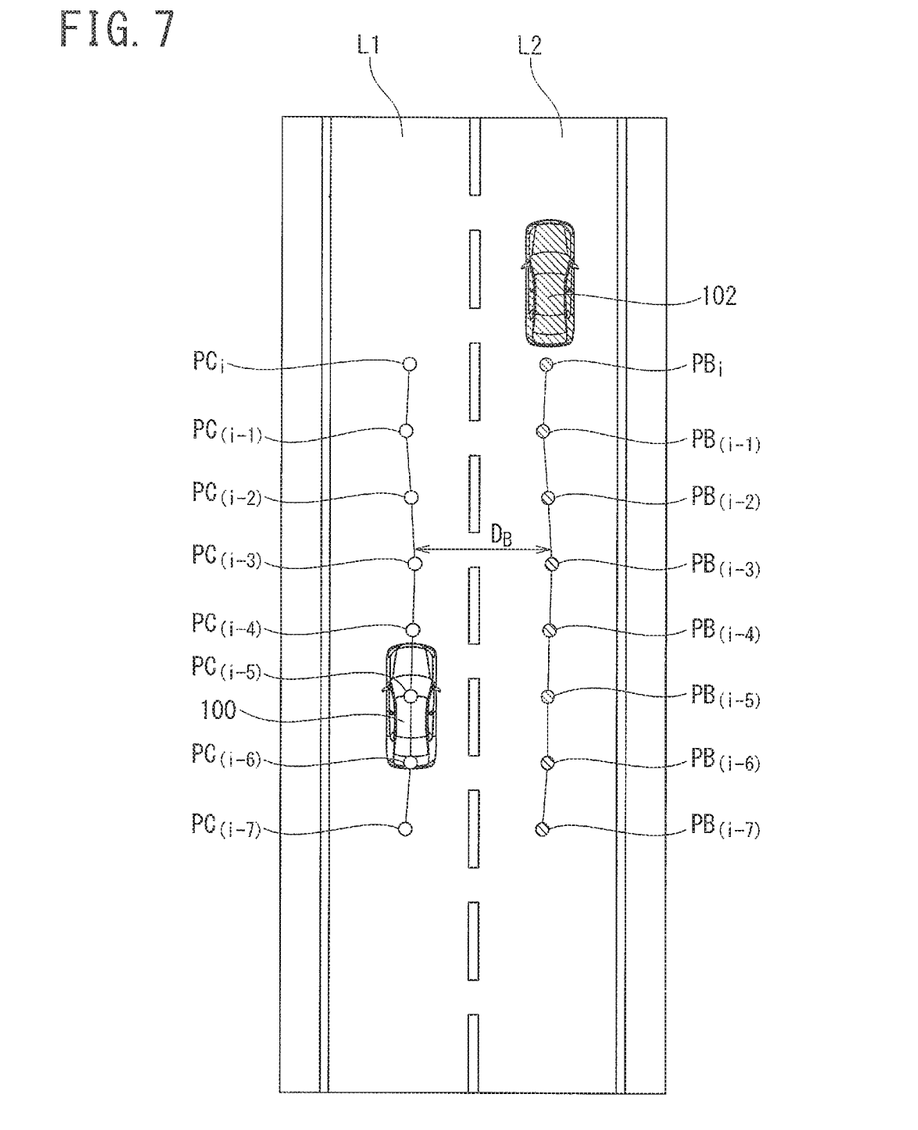
FIG. 7 is a schematic diagram illustrating another process of setting a route of the host vehicle according to the embodiment of the present invention.

When the traveling tracks $PB_i$ to $PB_{(i-7)}$ of the other vehicle 102 traveling on the different lane L2 are chosen as a target to follow, as illustrated in FIG. 7, the traveling tracks $PB_i$ to $PB_{(i-7)}$ of the other vehicle 102 are offset toward the host vehicle 100 (in the left direction) by the distance DB between the host vehicle 100 and the traveling tracks $PB_i$ to $PB_{(i-7)}$ of the other vehicle 102 previously calculated during the lane determination processing for the other vehicle 102. The offset traveling tracks $PC_i$ to $PC_{(i-7)}$ are then set as a route of the host vehicle 100.

A vehicle control unit 16 outputs, to various types of actuators, control signals for executing driving assistance or autonomous driving operations of the host vehicle, such as acceleration or deceleration control, braking control, or steering control, so that the host vehicle travels on the route set by the route setting circuit 15.

<Route Setting Method>

Figure 8:
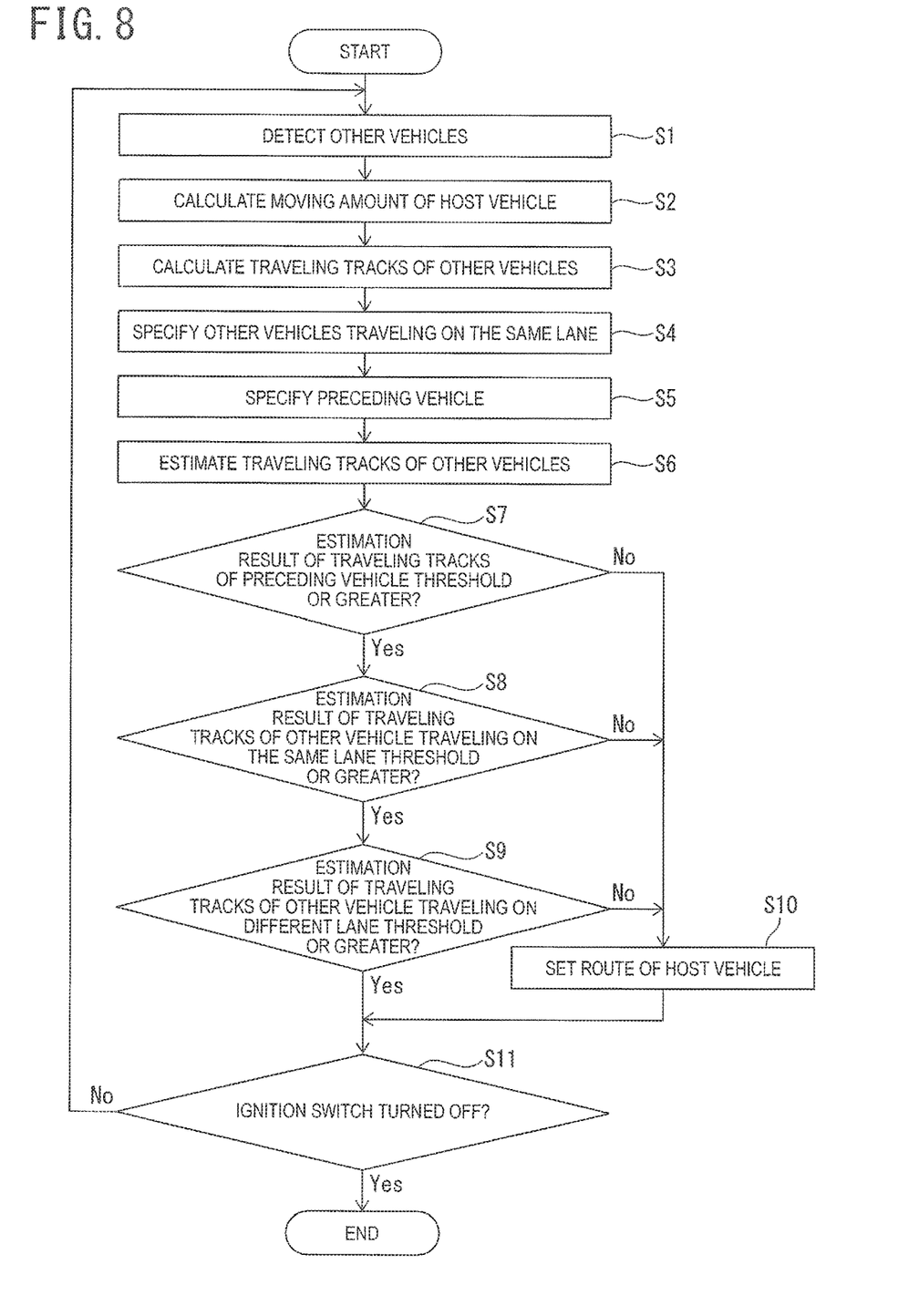
FIG. 8 is a flow chart illustrating a route setting method according to the embodiment of the present invention.

An example of a route setting method according to the embodiment of the present invention is described with reference to the flow chart illustrated in FIG. 8. The process in the flow chart illustrated in FIG. 8 is repeated in a predetermined processing cycle.

In step S1, the peripheral vehicle sensor 2 detects other vehicles traveling around the host vehicle, including a preceding vehicle traveling forward of the host vehicle. In step S2, the moving-amount calculation unit 11 calculates the moving amount ($\Delta X$, $\Delta Y$, $\Delta \phi$) of the host vehicle in accordance with the wheel velocity detected by the wheel velocity sensor 4 and the yaw rate detected by the yaw rate sensor 5.

In step S3, the traveling track calculation unit 12 calculates traveling tracks of the other vehicles based on histories of positions of the other vehicles (in a time series) in accordance with the information on the positions of the other vehicles detected by the peripheral vehicle sensor 2 and the moving amount ($\Delta X$, $\Delta Y$, $\Delta \phi$) of the host vehicle calculated by the moving-amount calculation unit 11. For example, the traveling track calculation unit 12 stores, in the storage device of the control device 1, the positions of the other vehicles (for example, the central positions at the rear portions of the other vehicles) detected by the peripheral vehicle sensor 2 in the current processing period. The traveling track calculation unit 12 also reads out, from the storage device of the control device 1, the histories of the positions of the other vehicles (in a time series) stored by the previous processing period, and updates the histories so as to move the positions by the moving amount ($\Delta X$, $\Delta Y$, $\Delta \phi$) of the host vehicle. The traveling track calculation unit 12 adds the positions of the other vehicles detected in the current processing period to the updated histories of the positions of the other vehicles (in a time series) so as to obtain the traveling tracks of the other vehicles.

In step S4, the traveling track estimation circuit 14 specifies the other vehicles traveling on the same lane as the host vehicle in accordance with the traveling tracks of the other vehicles calculated by the traveling track calculation unit 12. For example, the traveling track calculation unit 12 calculates a distance between the host vehicle and the traveling tracks of the respective other vehicles and determines the other vehicles to be traveling on the same lane as the host vehicle when the calculated distance is less than a predetermined threshold (for example, 2.0 meters).

In step S5, the traveling track calculation unit 12 further specifies other vehicle, as a preceding vehicle, traveling forward of the host vehicle and closest to the host vehicle among the other vehicles determined to be traveling on the same lane according to the information on the positions of the other vehicles detected by the peripheral vehicle sensor 2. The traveling track calculation unit 12 may specify the next preceding vehicle traveling forward of the host vehicle and second closest to the host vehicle among the other vehicles determined to be traveling on the same lane according to the information on the positions of the other vehicles detected by the peripheral vehicle sensor 2.

In step S6, the traveling track estimation circuit 14 estimates the traveling tracks of the other vehicles calculated by the traveling track calculation unit 12. For example, the traveling track estimation circuit 14 sets an estimation interval from the position of the preceding vehicle to a position distant rearward by a predetermined distance (for example, 100 meters). The traveling track estimation circuit 14 then causes the traveling tracks within the set estimation interval to approximate to a straight line, and divides the approximate interval into sections when a distance between the approximate straight line and the respective traveling tracks is greater than a predetermined threshold (for example, 0.2 meters) so that the distance between the approximate straight line and the respective traveling tracks results in the predetermined threshold (for example, 0.2 meters) or less. The traveling track estimation circuit 14 outputs the divided number of the estimation interval as the displaced amount (the estimation result) of the traveling tracks of the respective other vehicles.

In step S7, the route setting circuit 15 determines whether the displaced amount of the traveling tracks of the preceding vehicle, among the displaced amounts of the traveling tracks of the other vehicles calculated by the traveling track estimation circuit 14, is a predetermined threshold (for example, the divided number=3) or greater. When the displaced amount of the traveling tracks of the preceding vehicle is less than the predetermined threshold, the preceding vehicle is considered to be traveling stably without right and left weaving, so that the traveling tracks of the preceding vehicle are chosen as a target to follow, and the process proceeds to step S10. In step S10, the route setting circuit 15 sets, as a route of the host vehicle, the traveling tracks of the preceding vehicle chosen as a target to follow in step S7. The vehicle control unit 16 outputs, to various types of actuators, the control signals for executing driving assistance or autonomous driving operations so that the host vehicle travels on the route set by the route setting circuit 15.

When the displaced amount of the traveling tracks of the preceding vehicle is determined to be the predetermined threshold or greater in step S7, the traveling tracks of the preceding vehicle are considered to be unstable due to right and left weaving, and the process proceeds to step S8 so as to further search for traveling tracks of another vehicle as a target to follow instead of the preceding vehicle.

In step S8, the route setting circuit 15 determines whether the displaced amount of the traveling tracks of the other vehicle, other than the preceding vehicle, such as the next preceding vehicle traveling on the same lane is the predetermined threshold (for example, the divided number=3) or greater. When the displaced amount of the traveling tracks of the other vehicle traveling on the same lane is less than the predetermined threshold, the other vehicle is considered to be traveling stably without right and left weaving, so that the traveling tracks of the other vehicle traveling on the same lane are chosen as a target to follow, and the process proceeds to step S10. When there are several vehicles traveling on the same lane, a vehicle relatively close to the host vehicle such as the next preceding vehicle is chosen first as a target to follow. In step S10, the route setting circuit 15 sets, as a route of the host vehicle, the traveling tracks of the other vehicle such as the next preceding vehicle traveling on the same lane chosen as a target to follow in step S8. The vehicle control unit 16 outputs, to various types of actuators, the control signals for executing driving assistance or autonomous driving operations so that the host vehicle travels on the route set by the route setting circuit 15.

When the displaced amount of the traveling tracks of the other vehicle traveling on the same lane is determined to be the predetermined threshold or greater in step S8, the traveling tracks of the other vehicle traveling on the same lane are considered to be unstable due to right and left weaving, and the process proceeds to step S9 so as to further search for traveling tracks of another vehicle as a target to follow instead of the other vehicle traveling on the same lane.

In step S9, the route setting circuit 15 determines whether the displaced amount of the traveling tracks of the other vehicle traveling on the different lane is the predetermined threshold (for example, the divided number=3) or greater. When the displaced amount of the traveling tracks of the other vehicle traveling on the different lane is less than the predetermined threshold, the other vehicle is considered to be traveling stably without right and left weaving, so that the traveling tracks of the other vehicle traveling on the different lane are chosen as a target to follow, and the process proceeds to step S10. When there are several vehicles traveling on the different lane, a vehicle relatively close to the host vehicle may be chosen first as a target to follow. In step S10, the route setting circuit 15 sets, as a route of the host vehicle, offset traveling tracks of the other vehicle traveling on the different lane chosen as a target to follow in step S9 such that the traveling tracks of the other vehicle are offset toward the host vehicle by a distance between the host vehicle and the respective traveling tracks calculated in step S4. The vehicle control unit 16 outputs, to various types of actuators, the control signals for executing driving assistance or autonomous driving operations so that the host vehicle travels on the route set by the route setting circuit 15.

When the displaced amount of the traveling tracks of the other vehicle traveling on the different lane is determined to be the predetermined threshold or greater in step S9, the process proceeds to step S11 without further control of following any vehicle.

In step S11, the control device 1 determines whether an ignition switch of the host vehicle is turned off. When the ignition switch is determined not to be turned off yet, the process returns to step S1 to repeat the process from step S1 to step S10. When the ignition switch is determined to be turned off in step S11, the process ends.

The predetermined threshold used as a criterion for determining the displaced amount of the traveling tracks of the other vehicles used in steps S7, S8, and S9 may be the same or different from each other.

<Route Setting Program>

A series of steps of the route setting method illustrated in FIG. 8 can be implemented in a route setting program according to the embodiment of the present invention, so as to be executed by a computer such as the control device 1 included in the route setting device illustrated in FIG. 1. The route setting program according to the embodiment of the present invention can be stored in the storage device of the control device 1, for example.

According to the embodiment of the present invention, as described above, the displaced amount of the traveling tracks of the preceding vehicle in the right and left direction is calculated, and a route of the host vehicle is set according to the traveling tracks of another vehicle different from the preceding vehicle when the displaced amount of the traveling tracks of the preceding vehicle is the predetermined threshold or greater. In a case in which the traveling tracks of the preceding vehicle are unstable due to weaving and are thus inappropriate as a target to follow, the traveling tracks of the preceding vehicle are excluded from the target to follow, so as to set a route of the host vehicle based on the traveling tracks of another vehicle chosen as an appropriate target to follow instead of the preceding vehicle. Accordingly, the host vehicle can follow the traveling tracks of an appropriate vehicle chosen from the traveling tracks of other vehicles including the preceding vehicle so as to travel stably.

When the displaced amount of the traveling tracks of the preceding vehicle is the predetermined threshold or greater, a route of the host vehicle is set according to the traveling tracks of the next preceding vehicle. Since the traveling tracks of the other vehicle such as the next preceding vehicle traveling on the same lane are preferentially chosen as a target to follow in a case in which the traveling tracks of the preceding vehicle are unstable due to weaving, for example, and are thus an inappropriate target, the host vehicle follows the traveling tracks of the other vehicle such as the next preceding vehicle traveling on the same lane, so as to set a route of the host vehicle with high accuracy.

When the displaced amount of the traveling tracks of the other vehicle traveling on the same lane is the predetermined threshold or greater, a route of the host vehicle is set according to the traveling tracks of another vehicle traveling on the different lane. In a case in which the traveling tracks of the other vehicle traveling on the same lane are unstable due to weaving, for example, and are thus an inappropriate target, the traveling tracks of the other vehicle traveling on the different lane are chosen as a target to follow so that the host vehicle follows the traveling tracks of the other vehicle traveling on the different lane. Accordingly, the control of following the traveling tracks can continuously be executed.

First Modified Example

Figure 9:
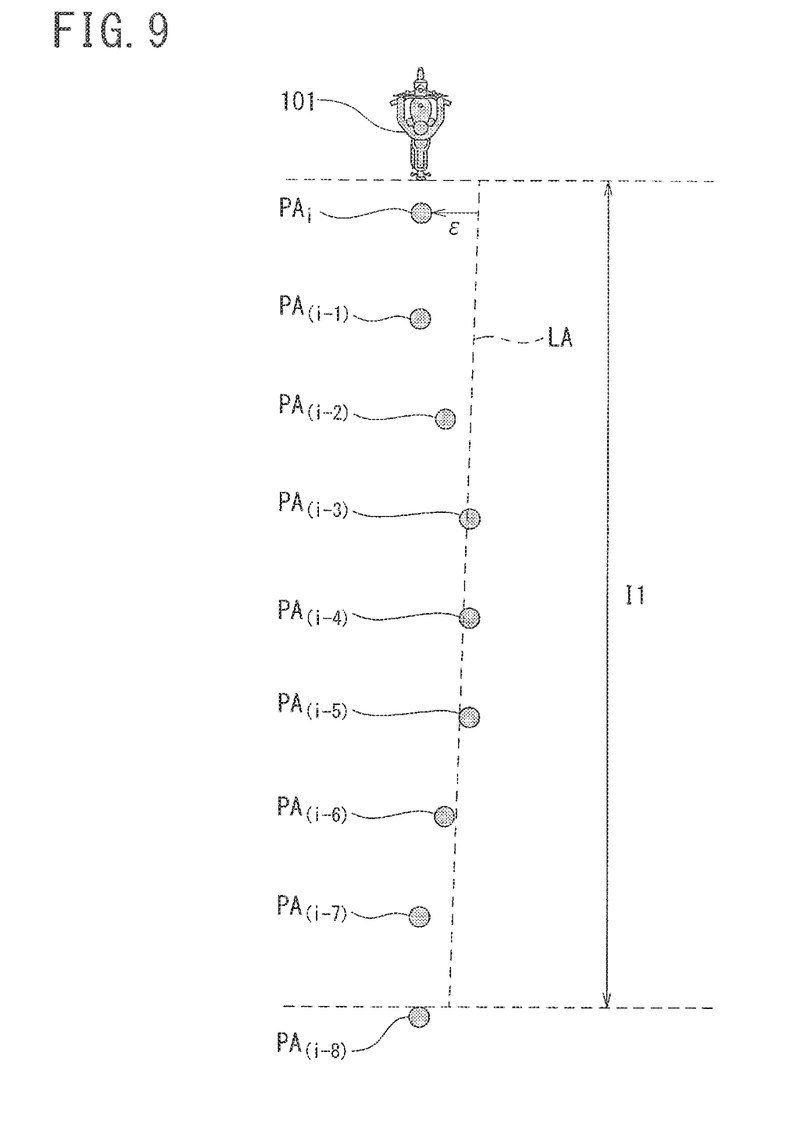
FIG. 9 is a schematic diagram illustrating a process of estimating traveling tracks of another vehicle according to a first modified example of the embodiment of the present invention.

While the embodiment of the present invention has been illustrated with the case in which the traveling track calculation circuit 14 allots an estimation interval to traveling tracks of another vehicle and calculates the number of divided estimation intervals as the displaced amount of the traveling tracks of the other vehicle, the method of calculating the displaced amount of the traveling tracks of the other vehicle (namely, the method of estimating the traveling tracks of the other vehicle) is not limited to the above method. For example, as illustrated in FIG. 9, the estimation interval I1 is allotted to the traveling tracks $PA_i$ to $PA_{(i-8)}$ of the preceding vehicle 101 so as to cause the traveling tracks $PA_i$ to $PA_{(i-7)}$ of the preceding vehicle 101 within the estimation interval I1 to approximate to a straight line LA or a curve. Using the shifted amounts ε of the traveling tracks with respect to the approximate straight line LA or the approximate curve, the sum S of the shifted amounts ε may be calculated as the displaced amount of the traveling tracks $PA_i$ to $PA_{(i-7)}$ of the preceding vehicle 101 according to the formula (1).

[Math. 1]

$$S = \sum_{i=0}^{n} \varepsilon_i \quad (1)$$

According to the first modified example, the method of calculating the displaced amount of the traveling tracks of the other vehicle (namely, the method of estimating the traveling tracks of the other vehicle) may employ various methods and can be determined as appropriate.

Second Modified Example

The embodiment of the present invention has been illustrated with the case in which the route setting circuit 15 chooses the traveling tracks of the preceding vehicle as a target to follow regardless of whether the preceding vehicle is a two-wheeled vehicle or a four-wheeled vehicle. A two-wheeled vehicle is presumed to tend to weave right and left during traveling more than a four-wheeled vehicle. The route setting circuit 15 therefore may determine whether the preceding vehicle is a two-wheeled vehicle or not (a four-wheeled vehicle) in accordance with the detection results by the peripheral vehicle sensor 2, for example. When the preceding vehicle is determined to be a two-wheeled vehicle, the traveling tracks of the preceding vehicle may be excluded from a target to follow without determining whether the displaced amount of the traveling tracks of the preceding vehicle is a predetermined threshold or greater.

Figure 10:
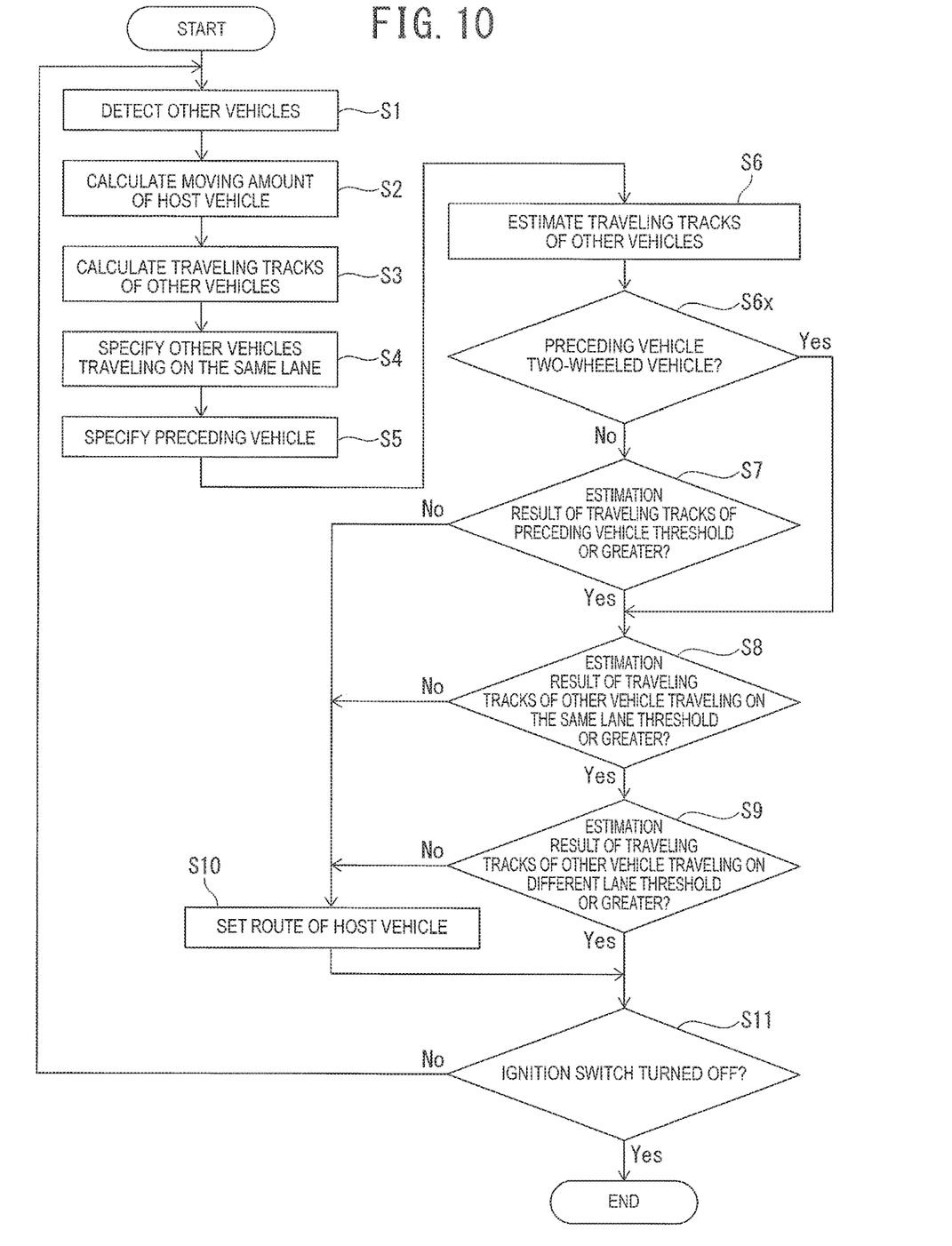
FIG. 10 is a flow chart illustrating a route setting method according to a second modified example of the embodiment of the present invention.

For example, the flow chart illustrated in FIG. 10 differs from the flow chart illustrated in FIG. 8 in that step S6*x* is added between the steps S6 and S7. In step S6*x*, the route setting circuit 15 determines whether the preceding vehicle is a two-wheeled vehicle or not (a four-wheeled vehicle) in accordance with the detection results by the peripheral vehicle sensor 2, for example. When the preceding vehicle is determined not to be a two-wheeled vehicle, the process proceeds to step S7. When the preceding vehicle is determined to be a two-wheeled vehicle in step S6*x*, the process proceeds to step S8.

According to the second modified example, when the preceding vehicle is determined to be a two-wheeled vehicle, the preceding vehicle is immediately excluded from a target to follow, and the traveling tracks of another vehicle other than the preceding vehicle can be chosen as a target to follow, so as to eliminate the traveling tracks of a two-wheeled vehicle which tends to weave as compared with a four-wheeled vehicle at an early stage.

Other Embodiments

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure. It should also be understood that the present invention includes various embodiments not disclosed herein. Therefore, the technical scope of the present invention is defined only by the specifying matters according to claims reasonably derived from the foregoing descriptions.

REFERENCE SIGNS LIST

1 Control device
2 Peripheral vehicle sensor
3 Vehicle information sensor
4 Wheel velocity sensor
5 Yaw rate sensor
11 Moving-amount calculation unit
12 Traveling track calculation unit
13 Route setting unit
14 Traveling track estimation circuit 15 Route setting circuit
16 Vehicle control unit

The invention claimed is:

1. A route setting method using a peripheral vehicle sensor installed in a host vehicle to detect positions of other vehicles traveling around the host vehicle, and a controller for setting a route of the host vehicle according to traveling tracks of the other vehicles based on histories of positions of the other vehicles, the method comprising:
    calculating a displaced amount indicating right and left weaving of traveling tracks of a preceding vehicle specified from the other vehicles;
    setting the route of the host vehicle such that the host vehicle follows the traveling tracks of the preceding vehicle when the displaced amount is less than a first threshold; and
    setting the route of the host vehicle such that the host vehicle follows traveling tracks of another vehicle different from the preceding vehicle, instead of the traveling tracks of the preceding vehicle, when the displaced amount is the first threshold or greater.

2. The route setting method of claim 1, wherein the displaced amount is a displaced amount of the traveling tracks of the preceding vehicle with respect to an approximate straight line or an approximate curve of the traveling tracks of the preceding vehicle.

3. The route setting method of claim 1, wherein the route of the host vehicle is set such that the host vehicle follows traveling tracks of a next preceding vehicle when the displaced amount of the traveling tracks of the preceding vehicle is the first threshold or greater.

4. The route setting method of claim 1, wherein the route of the host vehicle is set such that the host vehicle follows the traveling tracks of the another vehicle traveling on a different lane from the host vehicle when the displaced amount of the traveling tracks of the preceding vehicle is the first threshold or greater.

5. The route setting method of claim 1, further comprising:
    determining whether the preceding vehicle is a two-wheeled vehicle; and
    setting the route of the host vehicle such that the host vehicle follows the traveling tracks of the another vehicle different from the preceding vehicle when the preceding vehicle is determined to be the two-wheeled vehicle.

6. The route setting method of claim 1, further comprising:
    calculating target traveling tracks of a target vehicle, wherein the target vehicle is the preceding vehicle or the another vehicle different, by:
        obtaining historical traveling tracks of the target vehicle;
        obtaining odometry information of the host vehicle;
        updating the historical traveling tracks based on the odometry information to obtain the target traveling tracks; and
        storing the target traveling tracks as the historical traveling tracks,
            wherein when the target vehicle is the preceding vehicle, the target traveling tracks are the traveling tracks of the preceding vehicle, and
            wherein when the target vehicle is the another vehicle, the target traveling tracks are the traveling tracks of the another vehicle.

7. The route setting method of claim 1, wherein calculating the displaced amount indicating right and left weaving of the traveling tracks of the preceding vehicle specified from the other vehicles comprises:
    segmenting the traveling tracks into straight line segments, wherein a traveling track of the traveling tracks is considered to fall on a certain straight line segment of the straight line segments when the traveling track is within a predetermined threshold distance of the certain straight line segment; and
    using a number of the straight line segments as the displaced amount indicating right and left weaving of the traveling tracks.

8. A route setting device comprising:
    a peripheral vehicle sensor installed in a host vehicle to detect positions of other vehicles traveling around the host vehicle; and
    a controller for setting a route of the host vehicle such that the host vehicle follows traveling tracks of the other vehicles based on histories of positions of the other vehicles,
    the controller being configured to calculate a displaced amount indicating right and left weaving of traveling tracks of a preceding vehicle specified from the other vehicles, set the route of the host vehicle such that the host vehicle follows the traveling tracks of the preceding vehicle when the displaced amount is less than a first threshold, and set the route of the host vehicle such that the host vehicle follows traveling tracks of another vehicle different from the preceding vehicle when the displaced amount is the first threshold or greater.

* * * * *